(12) United States Patent
Robins

(10) Patent No.: US 12,491,612 B2
(45) Date of Patent: Dec. 9, 2025

(54) WELD-ON DAMAGED FASTENER REMOVAL DEVICE

(71) Applicant: Terry K Robins, Minneapolis, KS (US)

(72) Inventor: Terry K Robins, Minneapolis, KS (US)

( * ) Notice: Subject to any disclaimer, the term of this patent is extended or adjusted under 35 U.S.C. 154(b) by 0 days.

(21) Appl. No.: 18/819,959

(22) Filed: Aug. 29, 2024

(65) Prior Publication Data

US 2024/0416493 A1 Dec. 19, 2024

Related U.S. Application Data

(63) Continuation-in-part of application No. 18/215,138, filed on Jun. 27, 2023, now abandoned, and a continuation-in-part of application No. 29/960,068, filed on Aug. 28, 2024, now Pat. No. Des. 1,101,527, and a continuation-in-part of application No. 29/949,421, filed on Jun. 26, 2024, now Pat. No. Des. 1,101,526.

(60) Provisional application No. 63/473,768, filed on Jun. 27, 2022.

(51) Int. Cl.
*B25B 27/18* (2006.01)
*B23K 9/16* (2006.01)

(52) U.S. Cl.
CPC .............. *B25B 27/18* (2013.01); *B23K 9/162* (2013.01)

(58) Field of Classification Search
CPC ....... B25B 11/00; B25B 13/00; B25B 13/065; B25B 13/481; B25B 23/0035; B25B 23/0042; B25B 23/1415; B25B 23/142; B25B 23/16; B25B 27/02; B25B 27/14; B25B 27/143; B25B 27/16; B25B 27/18; F16B 43/00; F16B 43/005; F16B 43/006; F16B 43/007; B23K 9/162

See application file for complete search history.

(56) References Cited

U.S. PATENT DOCUMENTS

| | | | | |
|---|---|---|---|---|
| 1,626,906 | A | * 5/1927 | Zilliox | ..................... B25B 13/08 81/177.85 |
| D435,765 | S | * 1/2001 | Owens | ............................ D8/21 |
| 6,202,515 | B1 | * 3/2001 | Denton | ............... B25B 23/0035 81/177.1 |

FOREIGN PATENT DOCUMENTS

WO WO-2005079477 A2 * 9/2005 .............. F16B 21/10

* cited by examiner

*Primary Examiner* — Lee A Holly
(74) *Attorney, Agent, or Firm* — Jeffrey L. Thompson; Thompson Law, P.A.

(57) ABSTRACT

A weld-on damaged fastener removal device has a weld cup with a deep concave form, and a detachable handle attached to the weld cup. The weld cup has a base and sidewalls that define a hex-shaped outer surface for accommodating a drive tool for rotating the device. A circular hole extends through the base, and a cone-shaped protrusion surrounds the hole. In use, the weld cup is positioned with the hole in the base of the weld cup aligned with the fastener, and the cone-shaped protrusion protruding toward and engaging the exposed end of the fastener. The handle is used to position and hold the weld cup on the fastener while welding the device to the fastener around the perimeter of the hole. A wrench or pry bar can then be used to apply a rotating or pulling force to the weld cup to remove the damaged fastener.

11 Claims, 8 Drawing Sheets

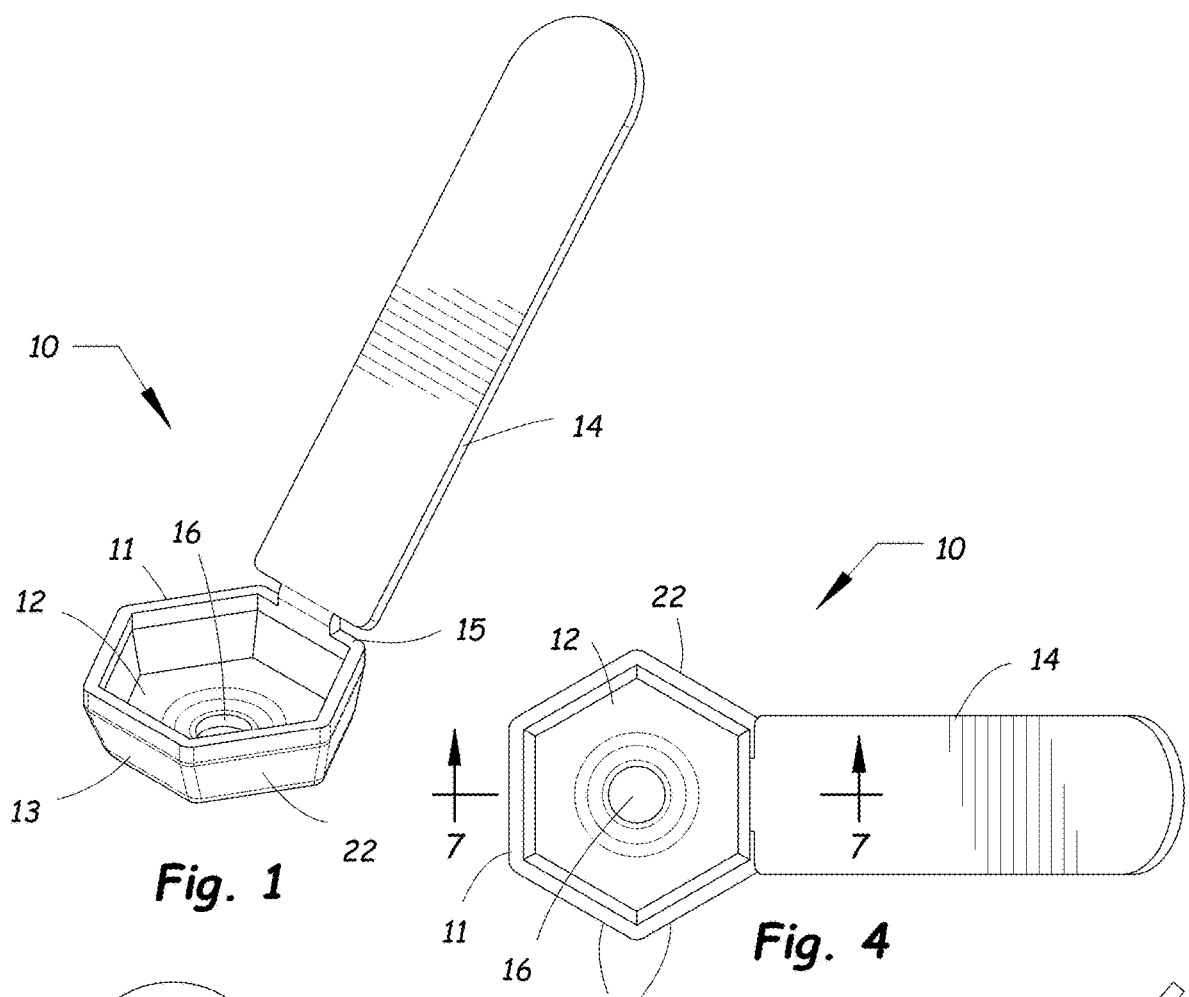
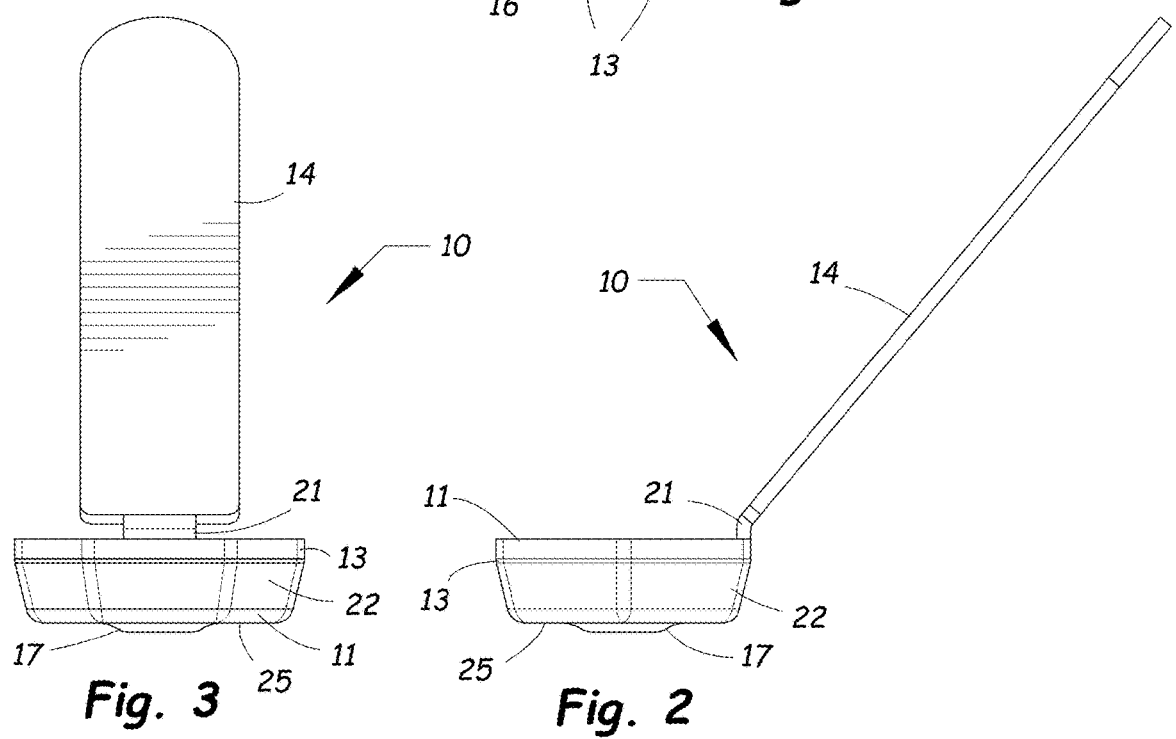

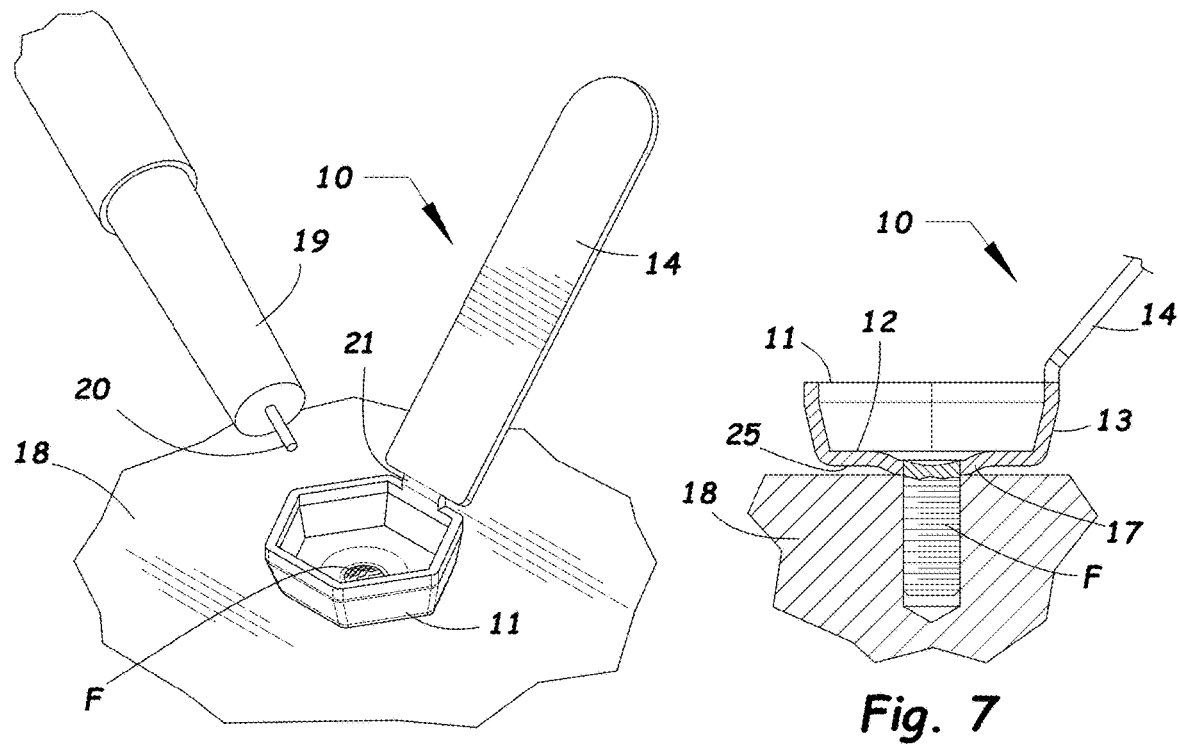
Fig. 5
Fig. 7
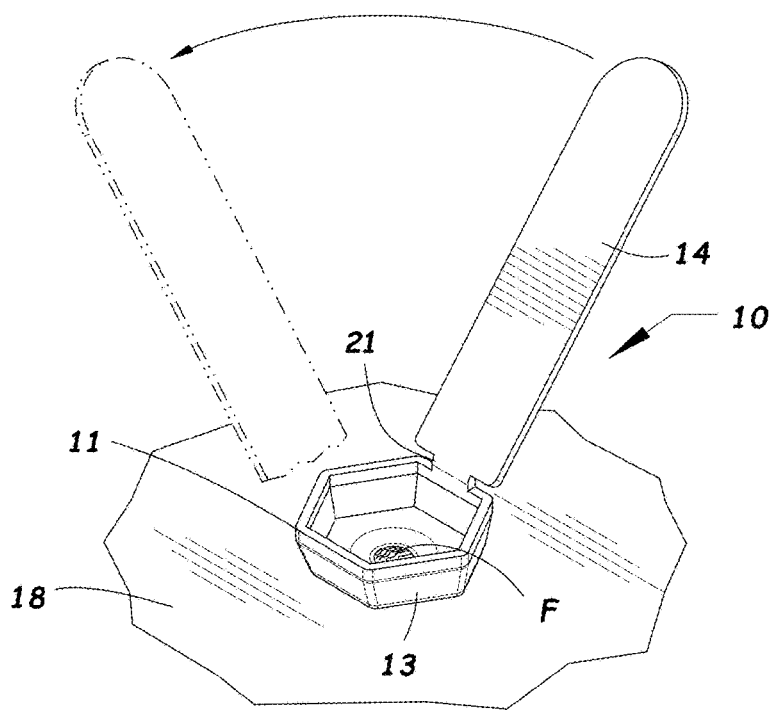
Fig. 6

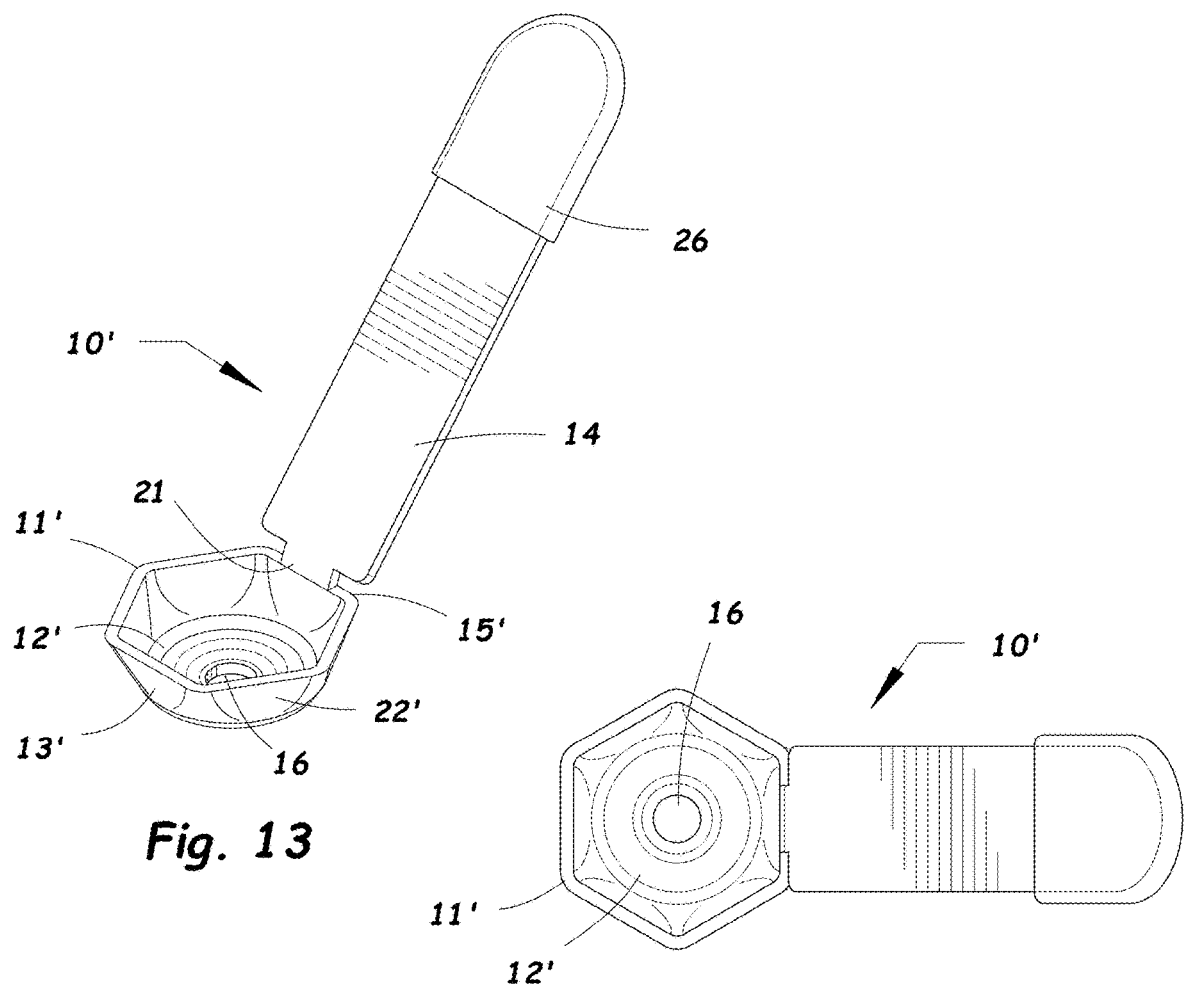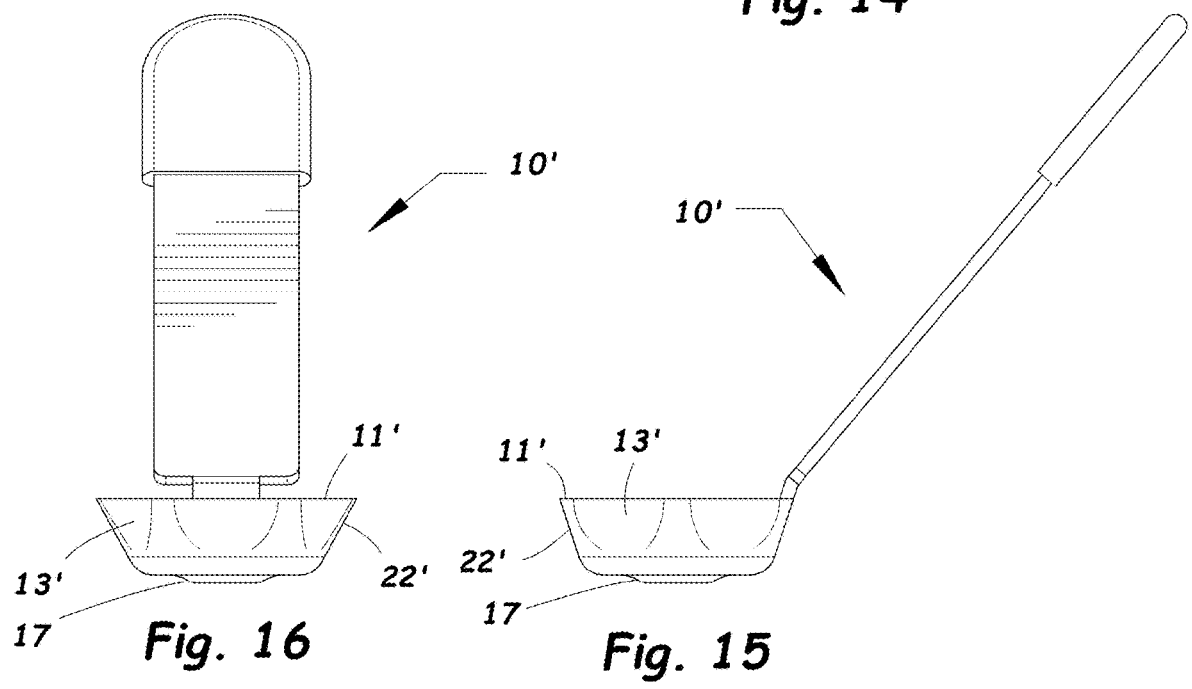

WELD-ON DAMAGED FASTENER REMOVAL DEVICE

RELATED APPLICATIONS

This application is a continuation-in-part of applicant's U.S. Utility patent application Ser. No. 18/215,138 filed on Jun. 27, 2023, a continuation-in-part of Applicant's U.S. Design patent application Ser. No. 29/949,421 filed on Jun. 26, 2024, and a continuation-in-part of Applicant's U.S. Design patent application Ser. No. 29/960,068 filed on Aug. 28, 2024. This application also claims the benefit of Applicant's U.S. Provisional Patent Application No. 63/473,768 filed on Jun. 27, 2022. The contents of these related applications are incorporated herein by reference.

BACKGROUND OF THE INVENTION

Field of the Invention

The present invention relates generally to devices and methods for removing damaged fasteners, and in particular, to weld-on devices and methods for extracting damaged fasteners from threaded and non-threaded bores.

Description of the Related Art

Various devices are known in the prior art for removing broken bolts from objects, such as engine blocks and the like. For example, U.S. Pat. No. 7,152,509 issued to McCalley, Jr. et al. discloses a fastener extractor that uses a plurality of helical ridges and grooves to engage with a drilled bore in the fastener. The use of such extractor tools is time consuming and often ineffective due to the difficulty in drilling a bore into the broken fastener and the tendency of the extractor tool to break during use.

U.S. Pat. No. 3,439,567 (Denis), U.S. Pat. No. 4,138,909 (Johnson) and U.S. Pat. No. 5,125,144 (Clark) disclose devices designed to be welded to the end of threaded fasteners to aid in the removal of the threaded fasteners. These devices use structures with an inner bore to guide a welding rod or the like into position to weld the device to the broken fasteners. The devices are then rotated using a wrench to remove the broken fasteners from their threaded holes.

There is a need in the industry for an improved weld-on fastener removal device.

SUMMARY OF THE INVENTION

An object of the present invention is to provide a removal tool that can be welded onto a damaged fastener so that the damaged fastener can be extracted effectively and rapidly.

A further object of the present invention is to provide a weld-on removal device that can be used to remove damaged fasteners without damaging surrounding surfaces.

A further object of the present invention is to provide a weld-on removal device that is easy to use, versatile for use with different types of fasteners (e.g., threaded and non-threaded), capable of extracting multiple sizes of fasteners, efficient in use, inexpensive to manufacture, and effective in operation.

To achieve these and other objects of the invention, a weld-on damaged fastener removal device is provided. The device has a weld cup with a deep concave form, and a detachable handle attached to the weld cup. The weld cup has a base and sidewalls that define a hex-shaped outer surface for accommodating a drive tool for rotating the device. A circular hole extends through the base, and a cone-shaped protrusion surrounds the hole. In use, the weld cup is positioned with the hole in the base of the weld cup aligned with the fastener, and the cone-shaped protrusion protruding toward and engaging the exposed end of the fastener. The handle is used to position and hold the weld cup on the fastener while welding the device to the fastener around the perimeter of the hole. A wrench or pry bar can then be used to apply a rotating or pulling force to the weld cup to remove the damaged fastener.

According to one aspect of the present invention, a fastener removal device is provided, comprising: a weld cup having a concave form with a base and sidewalls and a hole extending through the base, the weld cup being adapted to be positioned over a fastener to be removed with an end of the fastener aligned with the hole in the base; and a handle attached to the weld cup. The handle is usable to position and hold the weld cup on the fastener while welding the device to the fastener.

According to another aspect of the present invention, a method of removing a damaged fastener from an object is provided, comprising: providing a fastener removal device having a weld cup and a handle; positioning the removal device over the fastener with an exposed end of the fastener aligned with a hole in the base of the weld cup; welding the weld cup to the fastener around the perimeter of the hole; and applying a force to the weld cup to remove the fastener from the object.

According to another aspect of the present invention, a weld-on damaged fastener removal device is provided, comprising: a weld cup and a detachable handle formed as a single integral sheet metal structure. The weld cup has a deep concave form with a base and sidewalls and a circular hole extending through the base with a protrusion surrounding the hole. The weld cup has a hex-shaped outer surface defined by the sidewalls for accommodating a drive tool for rotating the device, and the weld cup is adapted to be positioned over a fastener to be removed with the hole in the base aligned with an exposed end of the fastener and the protrusion protruding toward the exposed end of the fastener. The detachable handle extends from one of the sidewalls of the weld cup and is usable to position and hold the weld cup on the fastener while welding the device to the fastener.

Numerous other objects of the present invention will be apparent to those skilled in this art from the following description wherein there is shown and described embodiments of the present invention, simply by way of illustration of some of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the invention is made with reference to the accompanying drawings. In the drawings:

FIG. 1 is a perspective view of a weld-on damaged fastener removal device according to the present invention.

FIG. 2 is a side elevation view of the fastener removal device.

FIG. 3 is a front elevation view of the fastener removal device.

FIG. 4 is a top plan view of the fastener removal device.

FIG. 5 shows the fastener removal device in the process of being welded to a damaged fastener.

FIG. 6 shows the fastener removal device being rotated to remove a damaged fastener using the detachable handle.

FIG. 7 is a cross section view taken along line 7-7 in FIG. 4 and showing the fastener removal device welded to a threaded fastener.

FIG. 13 is a top perspective view of a fastener removal tool according to another embodiment of the present invention.

FIG. 14 is a top view of the fastener removal tool shown in FIG. 13.

FIG. 15 is a right side view of the fastener removal tool shown in FIG. 13.

FIG. 16 is a front view of the fastener removal tool shown in FIG. 13.

DETAILED DESCRIPTION OF THE INVENTION

Figure 8:
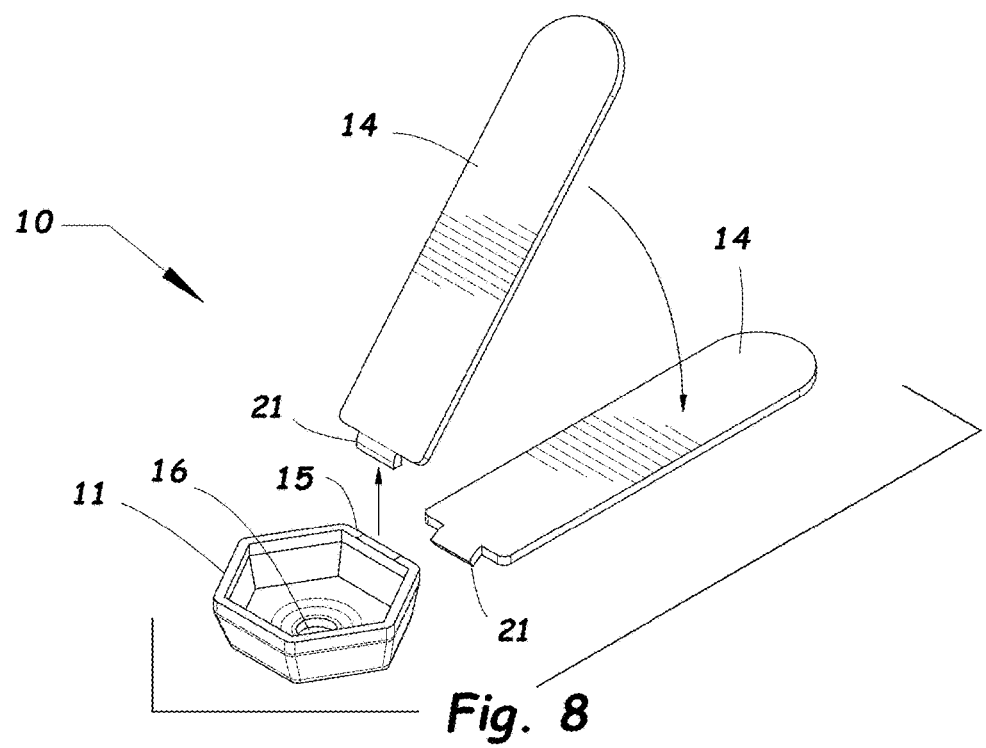
FIG. 8 is a perspective view of the fastener removal device showing a frangible connection that allows the detachable handle to be removed from the weld cup.

A weld-on fastener removal device 10, 10' according to the present invention will now be described with reference to FIGS. 1 to 22 of the accompanying drawings.

The weld-on fastener removal device 10 has a weld cup 11 with a deep concave form. The weld cup 11 has a base 12 and sidewalls 13. The sidewalls 13 are integral with and extend from the base 12 to a peripheral edge 15 defining an open side of the concave form. A detachable handle 14 is connected to and extends from the peripheral edge 15 of one of the sidewalls 13.

A circular hole 16 extends through a center of the base 12 and has a smaller diameter than a diameter of the fastener F to be removed. A cone-shaped protrusion 17 surrounds the hole 16 and protrudes toward the fastener F when the weld cup 11 is positioned for being welded to the exposed end of the fastener F. The cone-shaped protrusion 17 functions to self-align the weld cup 11 to the fastener F, particularly if the fastener F is broke off with its exposed end at or below the surface of the object 18 in which the fastener F is stuck. Often the fastener F shears away below the surface and is somewhat recessed within the object 18. The protrusion 17 aids in locating and centering the weld cup 11 in these cases by extending to the recessed fastener F and aligning the weld cup 11 with the centerline of the fastener F to improve the weld quality.

The deep concave form of the weld cup 11 functions to guide and align welding equipment, such as the tip 19 and/or welding wire 20 of a MIG or TIG welder or the welding rod of an ARC welder. The deep concave form of the weld cup 11 also functions to hold shielding gas within the welding area to improve the quality of the weld. The deep concave form also functions to control weld splatter when welding the weld cup 11 to the fastener F to avoid or minimize damage to surrounding surfaces.

The detachable handle 14 is attached to the weld cup 11 by a frangible, break-away connection 21 that allows the handle 14 to be detached from the weld cup 11. For example, the frangible connection 21 for attaching the handle 14 to the weld cup 11 can be created by providing a reduced width or thickness or perforations in the material connecting the handle 14 to the weld cup 11. In the illustrated embodiment, the frangible connection 21 is created by reducing the width of the handle 14 at the interface between the handle 14 and the edge 15 of the weld cup 11.

The handle 14 is ergonomically angled from the weld cup 11 for practical use and improved access to the weld cup 11 with welding equipment. The handle 14 is primarily used to position and hold the weld cup 11 over the exposed end of the fastener F while welding the device 10 to the fastener F. The handle 14 can also be used to provide the secondary function of applying a limited rotating or pulling force to the weld cup 11 to remove the damaged fastener F, when that limited force is deemed adequate for removal of the damaged fastener F.

Figure 9:
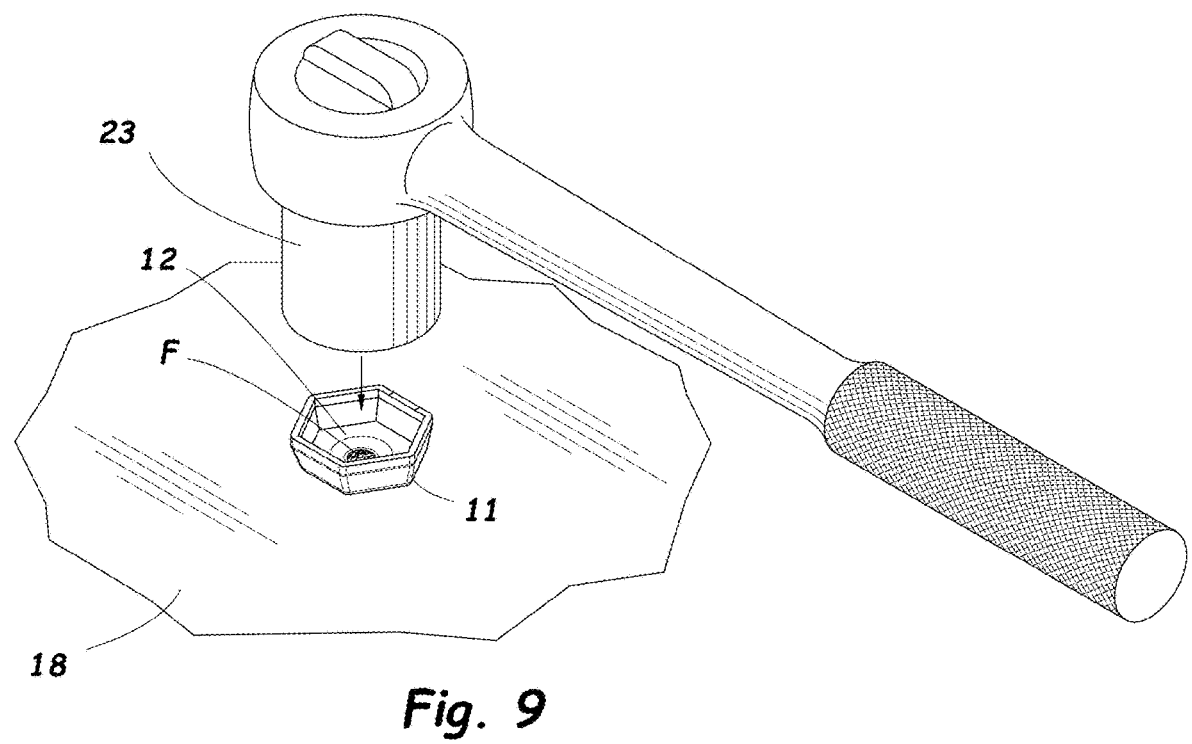
FIGS. 9 and 10 show a socket wrench being used to engage and turn the weld cup of the fastener removal device to remove a threaded fastener.
Figure 10:
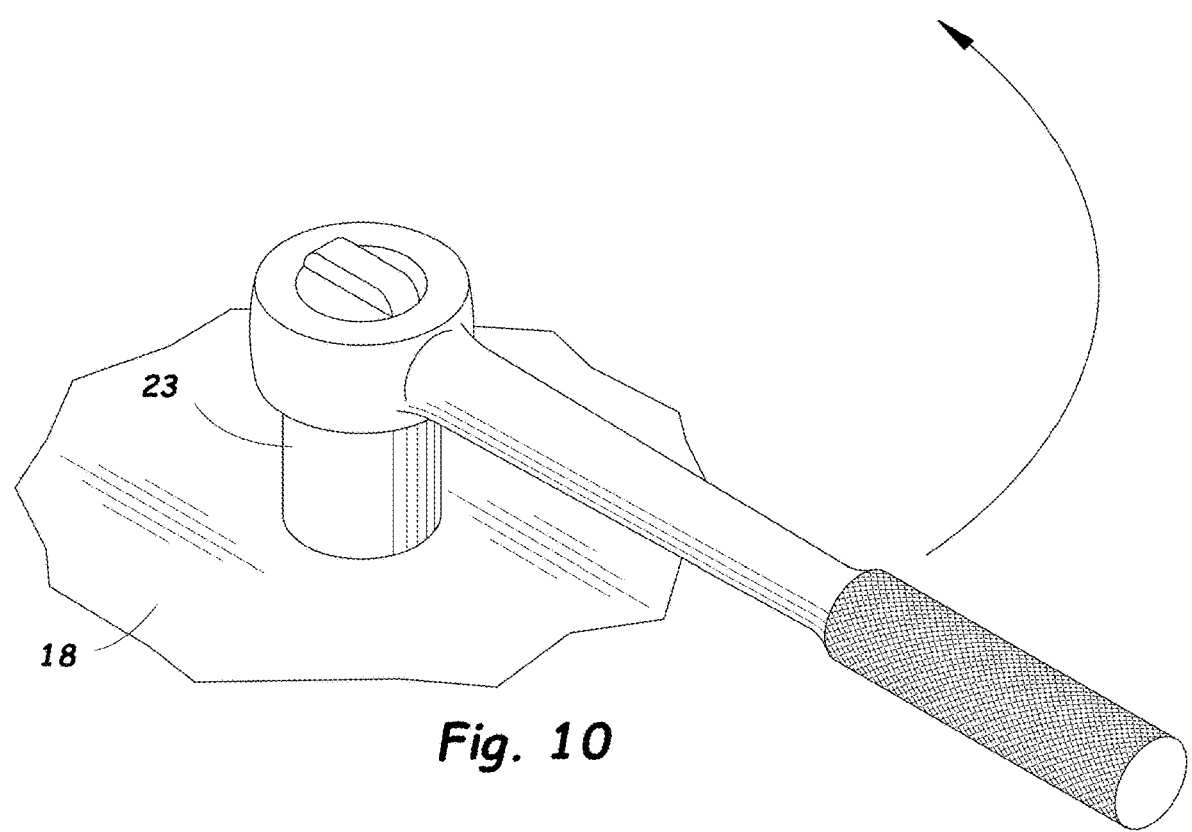

The base 12 and sidewalls 13 of the weld cup 11 define an outer surface 22 with an outer shape for accommodating a drive tool. The drive tool can be a wrench 23 for rotating the weld cup 11, such as an open or box end wrench or a socket wrench 23, as illustrated in FIGS. 9 and 10. For example, the weld cup can have a hex-shaped outer surface 22 to accommodate a wrench 23 for turning the weld cup 11 together with the fastener F to be removed.

Damaged fasteners often do not have a flat enough surface to allow the weld cup 11 to be attached to the fastener F with the base 12 of the weld cup 11 perpendicular to the longitudinal axis of the fastener F. In these cases, the weld cup 11 may be attached at an angle to the threaded fastener F due to the nature of the situation and the confinements of the work area (e.g., in an engine/motor compartment). Even in cases where the weld cup 11 is attached with the base 12 perpendicular to the axis of the fastener F, the confinements of the work area may require the drive tool 23 to be applied at an angle to the weld cup 11.

Figure 21:
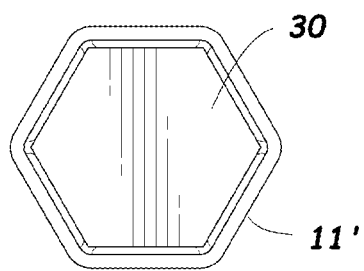
FIG. 21 is a top view of a hex-shaped drive tool positioned within the hex-shaped concave interior of the weld cup for rotating the fastener tool.

As illustrated in FIGS. 1 to 7, the hex-shaped outer surface 22 of the weld cup 11 tapers from a first diameter at the base of the weld cup 11 to a second diameter at the upper end of the weld cup 11. The first diameter at the base 12 of the weld cup 11 is smaller than the second diameter and provides a relief area to allow a socket wrench 23 to be positioned over the weld cup at a steep angle relative to the axis of rotation of the weld cup and/or the axis of the threaded fastener being removed. For example, the tapered sides of the weld cup 11 can allow a socket wrench 23 to be positioned with its axis at an angle of approximately 0 to 30 degrees relative to the axis of rotation of the weld cup and the threaded fastener being removed. The tapered sides of the weld cup 11 allow the device to be used in tight areas or other locations where a socket wrench cannot be perfectly aligned with the axis of rotation of the device, and in cases where the weld cup is welded to the fastener at an angle relative to the axis of the fastener. This feature is also illustrated in FIG. 21, which shows the socket wrench 23 positioned at an angle of approximately 20 degrees relative to the axis of rotation of the weld cup during use.

Figure 11:
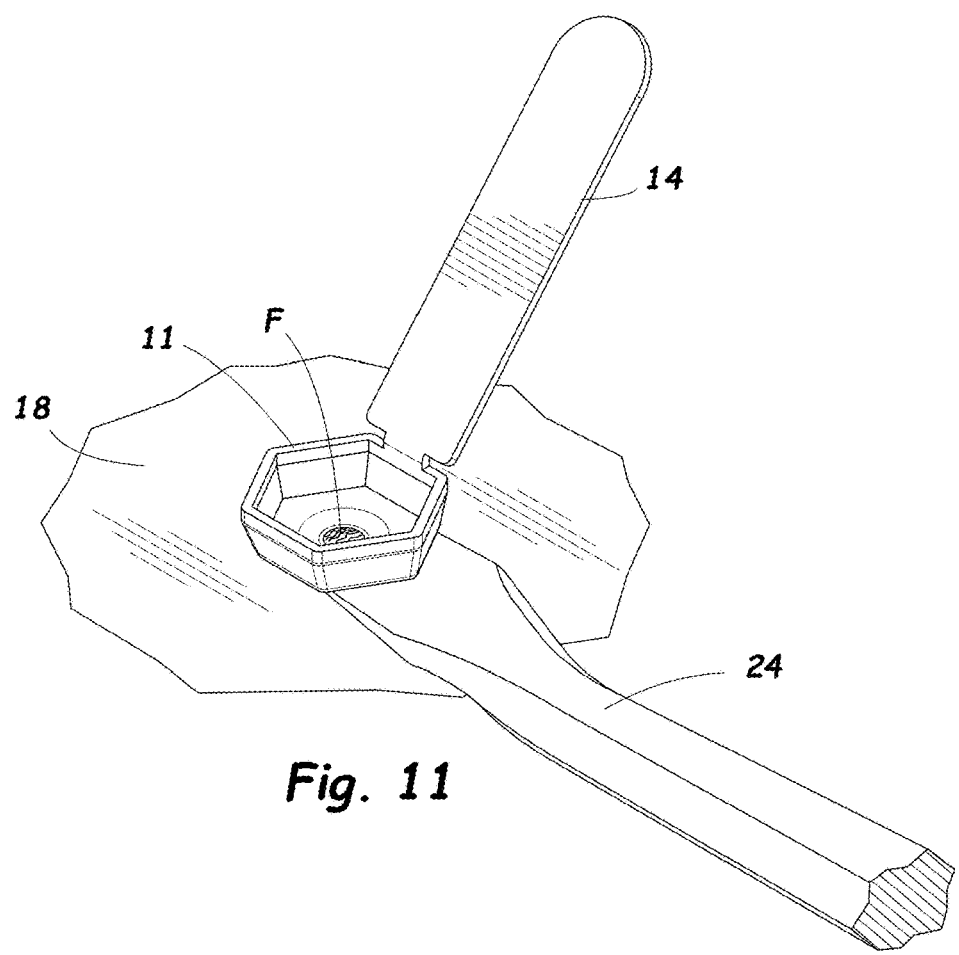
FIG. 11 shows a pry tool being used to lift the fastener removal device to remove a non-threaded fastener.
Figure 12:
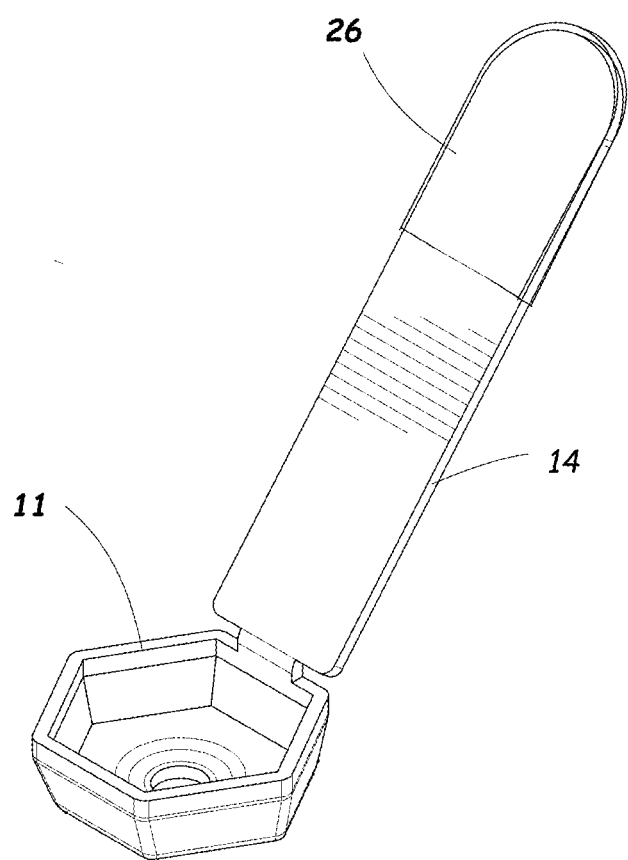
FIG. 12 is a perspective view showing the fastener removal device with a rubber sleeve covering a portion of the handle.
Figure 17:
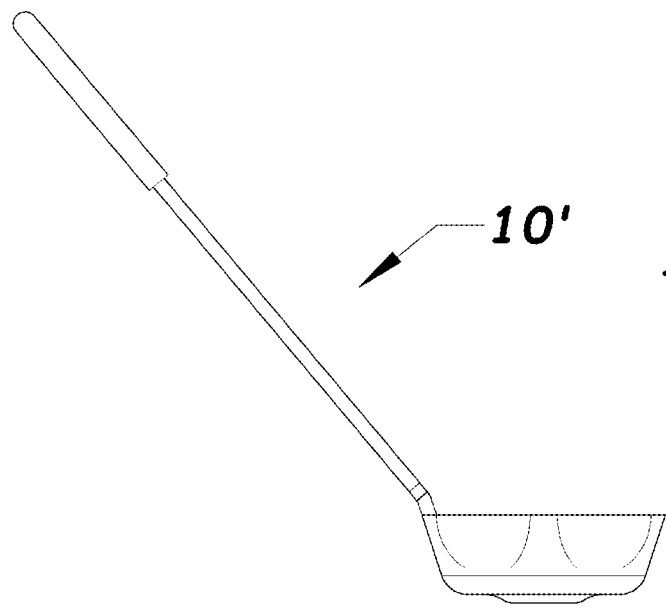
FIG. 17 is a left side view of the fastener removal tool shown in FIG. 13.
Figure 18:
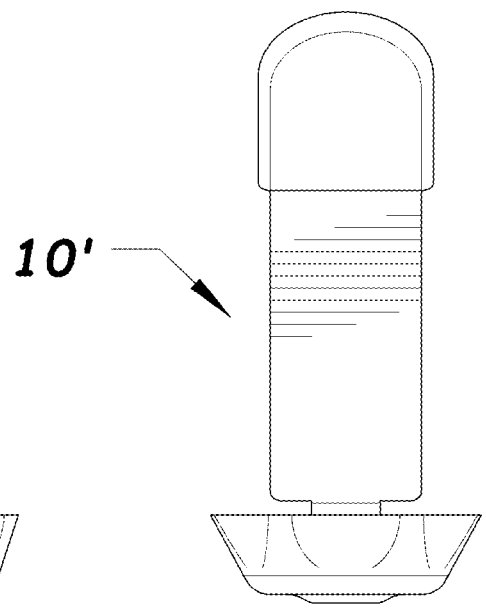
FIG. 18 is a rear view of the fastener removal tool shown in FIG. 13.
Figure 19:
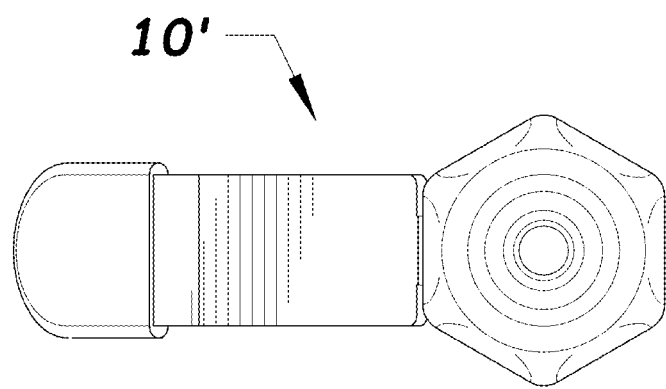
FIG. 19 is a bottom view of the fastener removal tool shown in FIG. 13.

Alternatively, the drive tool can be a pry bar 24 for applying a pulling force to the weld cup 11 to remove the fastener F from a non-threaded hole, as illustrated in FIG. 11. For example, the weld cup 11 can have an outer shape with a raised edge 25 adjacent to the cone-shaped protrusion 17 for engaging with a pry bar 24 for applying a prying force between the weld cup 11 and the object 18 in which the fastener F is stuck to pull the fastener F from the object 18.

The removal device 10 is nondirectional. The device 10 can be used with both right-hand and left-hand threaded fasteners F, or for providing a pulling action to remove non-threaded pins.

In use, the weld cup 11 is positioned with the hole 16 in the base 12 of the weld cup 11 aligned with the centerline of the fastener F, and the cone-shaped protrusion 17 protruding toward and engaging the exposed end of the fastener F. The handle 14 is used to position and hold the weld cup 11 on the fastener F while welding the device 10 to the fastener F around the inner perimeter of the hole 16 in the weld cup 11.

Once the weld cup 11 has been welded to the fastener F, the handle 14 can be used to apply a limited rotating or pulling force to remove the fastener F, if that limited force is deemed adequate to remove the damaged fastener F. If the force applied by the handle 14 is less than required to remove the damaged fastener F by hand force, or if the handle 14 has no clearance to rotate, then the handle 14 can be detached from the weld cup 11 in a predetermined manner.

For example, the handle 14 can be detached by bending it back and forth until the handle 14 breaks away or separates from the weld cup 11 at the connection 21. This break away feature is used after the weld cup 11 is attached to the damaged fastener F. After the handle 14 is detached from the weld cup 11, the weld cup 11 will accommodate many common tools to aid in the removal process. For example, a wrench 23 or pry bar 24 can be used to apply a rotating or pulling force to the weld cup 11 to remove the damaged fastener F from the object 18 in which it is stuck.

The fastener removal device 10 is not limited to removal of damaged bolts and screws. The removal device 10 also works well on broken thread tap tools and non-threaded fasteners, such as pins.

The fastener removal device 10 can be made of various materials, thicknesses and sizes to suit a variety of applications. For example, in one example embodiment, the device 10 is made of 16 gauge steel with a ¼" hole 16 in the base 12 of the weld cup 11 and a 1" hex shape (to fit a 1" wrench). In this example embodiment, the handle 14 extends from the edge 15 of the weld cup 11 approximately 2.5". A protective rubber sleeve 26 (FIG. 12) can be placed over the outer tip portion of the handle 14 to provide a gripping surface and to protect the user from heat and/or electricity used in the welding process.

The device 10 has a configuration that allows it to be made efficiently from a flat sheet of steel. For example, a single flat sheet of steel can be cut into the appropriate shape with the weld cup portion 11 and handle portion 14 together in a single integral piece. The hole 16 is drilled or stamped into the base 12 of the weld cup portion 11, and the cone-shaped protrusion 17 is formed at the same time or in a separate step. The cone-shaped protrusion 17 can be formed by pressing the area surrounding the hole 16 with a suitable die punch until it protrudes a small distance (e.g., ¹⁄₁₆") from the plane of the flat sheet.

The weld cup 11 can be formed by pressing the weld cup portion of the flat sheet into a metal die set having the shape and dimension of a wrench to be used with the device 10. For example, the metal die set can include a 6-point socket as the die block, which has the same internal size and shape as the desired outer surface 22 of the weld cup 11. A punch portion of the die can be either a round or hex-shaped punch that presses the weld cup portion into the die block until the desired shape is achieved. Thus, the device 10 can be made efficiently and cost effectively from sheet metal with a relatively simple die forming operation.

FIGS. 1 to 12 illustrate a removal device 10 formed using a hex-shaped punch to press the weld cup portion into a die block. FIGS. 13 to 19 illustrate a removal device 10' formed using a round punch to press the weld cup portion 11' into a hex-shaped die block. The removal device 10' shown in FIGS. 13 to 19 has the same elements as the removal device 10 shown in FIGS. 1 to 12, except that the removal device 10' has a round base that matches the shape of the round punch. The elements that are the same or substantially the same in the removal device 10' (FIGS. 13 to 19) as the corresponding elements in the removal device 10 (FIGS. 1 to 12) are indicated with the same reference numerals and will not be described again in detail.

As illustrated in FIGS. 13 to 19, the outer surface 22' of the weld cup 11' tapers from a first round diameter at the base 12' of the weld cup 11' to a second hex-shaped diameter at the peripheral edge 15' defining the open side of the concave form of the weld cup 11'. The first diameter at the base 12' of the weld cup 11' is substantially smaller than the second diameter at the peripheral edge 15' of the weld cup. This is in contrast to a typical hex-shaped device, such as a threaded nut or bolt head, which has straight side walls that prevent a drive socket from fitting over the hex-shaped device at an angle.

Figure 20:
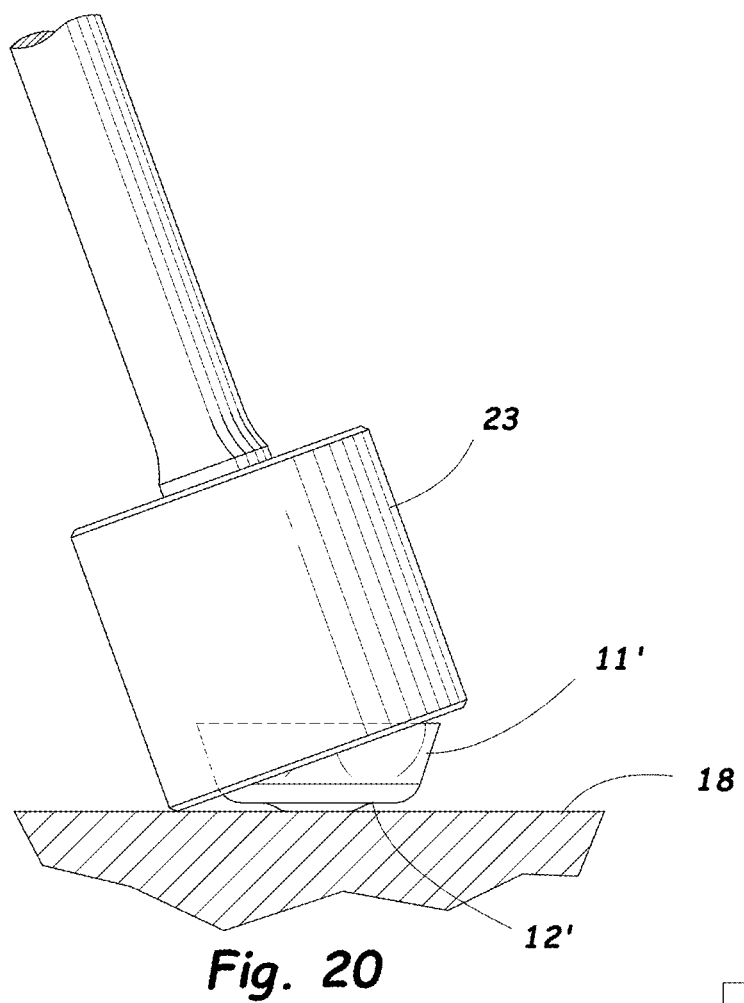
FIG. 20 is an elevation view showing a socket wrench positioned over the hex-shaped outer surface of the fastener removal tool at an angle relative to an axis of rotation of the fastener removal tool.

As illustrated in FIG. 20, the tapered sidewalls 13' of the weld cup allow a socket wrench 23 used as a drive tool to be applied to the weld cup 11' at a nonperpendicular angle to a plane containing the peripheral edge 15' of the weld cup 11'. In this case, the socket wrench 23 engages the hex-shaped outer surface at the peripheral edge 15' of the sidewalls 13' for rotating the weld cup 11' to remove a fastener F. The tapered outer surface 22' of the sidewalls 13' provides a relief area below the peripheral edge 15' of the weld cup 11' to allow the socket wrench 23 to be positioned over the weld cup 11' at a nonperpendicular angle relative to the weld cup 11' (i.e., the socket wrench 23 can be at an angle relative to the axis of rotation of the weld cup 11' and/or the axis of the threaded fastener F being removed). For example, the tapered outer surfaces 22' of the sidewalls 13' of the weld cup allow a socket wrench 23 to be positioned with its axis at an angle of approximately 0 to 30 degrees relative to the axis of rotation of the weld cup 11' and the threaded fastener F being removed. The tapered sidewalls 13' of the weld cup 11' allow the device 10' to be used in tight areas or other locations where a socket wrench 23 cannot be perfectly aligned with the axis of rotation of the weld cup 11'. The socket wrench 23 shown in FIG. 20 is positioned at an angle of approximately 20 degrees relative to the axis of rotation of the weld cup 11' to illustrate this feature.

Figure 22:
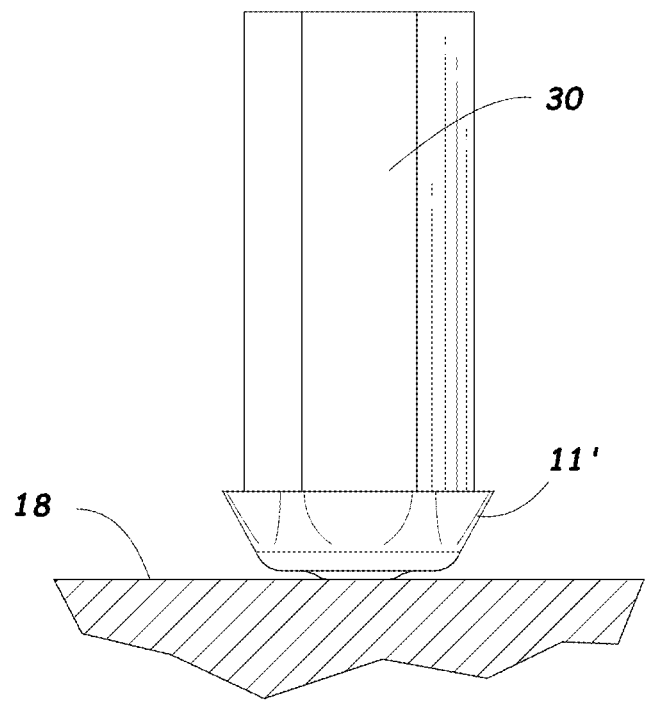
FIG. 22 is an elevation view showing the hex-shaped drive tool positioned within the concave form of the weld cup.

FIGS. 21 and 22 illustrate a feature of the present invention that allows a hex-shaped drive tool 30 to be used to rotate the device 10' to extract a threaded fastener. The weld cup 11' has a hex-shaped inner surface defined by the sidewalls 13', and the hex-shaped drive tool 30 is received within the hex-shaped inner surface (i.e., the hex drive 30 is inserted into the internal diameter of the weld cup 11). This feature provides additional flexibility in the type of drive tool that may be used with the removal device 10' (or the removal device 10 shown in FIGS. 1 to 12.

The removal device 10, 10' of the present invention provides an inexpensive and useful tool solution to an ongoing problem in the automotive, industrial and agricultural fields and in the "do it yourself" community. Welding equipment is commonplace in today's repair shops, maintenance shops, farms and many home work shops, and the removal device 10, 10' will aid in the use of such welding equipment to remove damaged fasteners F. After the damaged fastener F is removed, the tool and fastener can be recycled in a metal recycling process.

While the invention has been described in connection with specific embodiments thereof, it is to be understood that this is by way of illustration and not of limitation, and the scope of the appended claims should be construed as broadly as the prior art will permit.

What is claimed is:

1. A fastener removal device, comprising:
    a weld cup having a concave form with a base and sidewalls and a hole extending through the base, the weld cup being configured to be positioned over a fastener to be removed with an end of the fastener aligned with the hole in the base;
    a handle attached to the weld cup, said handle being usable to position and hold the weld cup on the fastener while welding the device to the fastener;
    the weld cup has an outer surface with a shape corresponding to a drive tool;
    the handle is attached to the weld cup by a frangible connection that allows the handle to be detached from the weld cup;
    the handle and the weld cup are formed as a single integral structure from a sheet of metal; and
    the sidewalls are integral with and extend from the base to a peripheral edge defining an open side of the concave form, the handle is connected to and extends from one of the sidewalls at the peripheral edge, and the sidewalls are angled from a first diameter at the base to a second diameter at the peripheral edge, said first diameter being smaller than said second diameter so that the base has a smaller diameter than the peripheral edge and the angled sidewalls therebetween allow a drive tool to be applied to engage the outer surface of the weld cup at a nonperpendicular angle to a plane containing the peripheral edge of the weld cup for rotating the weld cup to remove a fastener;
    wherein the hole extending through the base of the weld cup is a circular hole extending through a center of the base and has a smaller diameter than a diameter of the fastener to be removed.

2. The fastener removal device according to claim 1, wherein the outer surface of the weld cup is hex shaped to accommodate a wrench for turning the weld cup together with the fastener to be removed.

3. The fastener removal device according to claim 1, wherein the weld cup has a raised edge adjacent to the hole for applying a removal force to the weld cup with a pry tool.

4. The fastener removal device according to claim 1, wherein the concave form of the weld cup is configured to guide and align welding equipment and welding wire, hold welding shielding gas, and control weld splatter when welding the weld cup to the fastener.

5. The fastener removal device according to claim 1, wherein the frangible connection comprises a reduced width, thickness or perforations in the material connecting the handle to the weld cup.

6. A fastener removal device, comprising:
    a weld cup having a concave form with a base and sidewalls and a hole extending through the base, the weld cup being configured to be positioned over a fastener to be removed with an end of the fastener aligned with the hole in the base;
    a handle attached to the weld cup, said handle being usable to position and hold the weld cup on the fastener while welding the device to the fastener;
    the weld cup has an outer surface with a shape corresponding to a drive tool;
    the handle is attached to the weld cup by a frangible connection that allows the handle to be detached from the weld cup;
    the handle and the weld cup are formed as a single integral structure from a sheet of metal; and
    the sidewalls are integral with and extend from the base to a peripheral edge defining an open side of the concave form, the handle is connected to and extends from one of the sidewalls at the peripheral edge, and the sidewalls are angled from a first diameter at the base to a second diameter at the peripheral edge, said first diameter being smaller than said second diameter so that the base has a smaller diameter than the peripheral edge and the angled sidewalls therebetween allow a drive tool to be applied to engage the outer surface of the weld cup at a nonperpendicular angle to a plane containing the peripheral edge of the weld cup for rotating the weld cup to remove a fastener;
    wherein the hole extending through the base of the weld cup is surrounded by a cone-shaped protrusion that extends toward the fastener when the weld cup is positioned for being welded to the fastener.

7. The fastener removal device according to claim 6, wherein the hole extending through the base of the weld cup is a circular hole extending through a center of the base and has a smaller diameter than a diameter of the fastener to be removed.

8. The fastener removal device according to claim 6, wherein the outer surface of the weld cup is hex shaped to accommodate a wrench for turning the weld cup together with the fastener to be removed.

9. The fastener removal device according to claim 6, wherein the weld cup has a raised edge adjacent to the hole for applying a removal force to the weld cup with a pry tool.

10. The fastener removal device according to claim 6, wherein the concave form of the weld cup is configured to guide and align welding equipment and welding wire, hold welding shielding gas, and control weld splatter when welding the weld cup to the fastener.

11. The fastener removal device according to claim 6, wherein the frangible connection comprises a reduced width, thickness or perforations in the material connecting the handle to the weld cup.

* * * * *